(12) United States Patent
Okuhara et al.

(10) Patent No.: US 10,220,739 B2
(45) Date of Patent: Mar. 5, 2019

(54) VEHICLE SEAT (71) Applicant: TOYOTA BOSHOKU KABUSHIKI KAISHA, Aichi-ken (JP)

(72) Inventors: Yoshikatsu Okuhara, Aichi-ken (JP); Shinya Ito, Aichi-ken (JP); Hirotaka Kato, Aichi-ken (JP); Taku Imajo, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 15/793,406

(22) Filed: Oct. 25, 2017

(65) Prior Publication Data

US 2018/0111528 A1  Apr. 26, 2018

(30) Foreign Application Priority Data

Oct. 26, 2016 (JP) .................. 2016-209711

(51) Int. Cl.
*B60N 2/26* (2006.01)
*B60N 2/28* (2006.01)
*B60N 2/58* (2006.01)
*B60N 2/56* (2006.01)

(52) U.S. Cl.
CPC ............ *B60N 2/58* (2013.01); *B60N 2/2887* (2013.01); *B60N 2/5628* (2013.01)

(58) Field of Classification Search
CPC ....... B60N 2/2887; B60N 2/58; B60N 2/5628
USPC .............. 297/253, 180.13, 180.14
See application file for complete search history.

(56) References Cited

U.S. PATENT DOCUMENTS

| | | | | |
|---|---|---|---|---|
| 4,756,573 A * | 7/1988 | Simin | ................ | B60N 2/3084 297/254 X |
| RE34,868 E * | 2/1995 | Vander Stel | ......... | B60N 2/3084 297/238 |
| 5,601,334 A * | 2/1997 | Marks | ................ | B60N 2/3084 297/253 X |
| 5,669,663 A * | 9/1997 | Feuerherdt | ............... | B60N 2/28 297/253 X |
| 5,918,930 A * | 7/1999 | Kawai | ..................... | A47C 7/74 297/180.1 |
| 6,196,628 B1 * | 3/2001 | Goy | ..................... | B60N 2/2821 297/253 X |
| 6,322,141 B1 * | 11/2001 | Dutkievic | ............ | B60N 2/2893 297/253 X |
| 6,416,128 B1 * | 7/2002 | Fujii | ................... | B60N 2/2893 297/253 X |

(Continued)

FOREIGN PATENT DOCUMENTS

JP    2015-85730    5/2015

*Primary Examiner* — Rodney B White
(74) *Attorney, Agent, or Firm* — Greenblum & Bernstein, P.L.C.

(57) ABSTRACT

A vehicle seat includes an ISOFIX anchor for fixing a child seat which is provided in a through-hole that extends in a front and rear direction and is formed in a seat body. The vehicle seat further includes: a cover member which covers an opening on a seat front side of the through-hole in an openable and closable manner; and a plug member which is capable of being pushed into the opening on the seat front side of the through-hole in a drawable manner, wherein the plug member is configured to block an air-flowing channel of an air which flows in from an opening on a seat back side of the through-hole and flows out from the opening on the seat front side of the through-hole in a state where the plug member is pushed into the opening.

12 Claims, 13 Drawing Sheets

(56) References Cited

U.S. PATENT DOCUMENTS

| | | | | |
|---|---|---|---|---|
| 6,478,376 B2* | 11/2002 | Hayashi | | B60N 2/2821 |
| | | | | 297/253 X |
| 6,601,917 B1* | 8/2003 | Christopherson | | B60N 2/2821 |
| | | | | 297/253 X |
| 7,093,896 B2* | 8/2006 | Morita | | B60N 2/2821 |
| | | | | 297/253 |
| 7,281,763 B1* | 10/2007 | Hayashi | | B60N 2/2893 |
| | | | | 297/253 |
| 7,427,103 B2* | 9/2008 | Weber | | B60N 2/2893 |
| | | | | 297/253 X |
| 7,699,396 B2* | 4/2010 | Ghisoni | | B60N 2/58 |
| | | | | 297/253 X |
| 7,722,105 B2* | 5/2010 | Shellhammer | | B60R 11/00 |
| | | | | 280/801.1 |
| 8,328,280 B2* | 12/2012 | Parker | | B60N 2/2887 |
| | | | | 297/253 X |
| 8,740,309 B2* | 6/2014 | Kajihara | | B60N 2/58 |
| | | | | 297/452.38 |
| 8,757,711 B2* | 6/2014 | Bertocchi | | B60N 2/0284 |
| | | | | 297/14 |
| 9,352,676 B1* | 5/2016 | Wright | | B60N 2/58 |
| 9,493,099 B2* | 11/2016 | Ruthinowski | | B60N 2/70 |
| 9,592,750 B2* | 3/2017 | Asaeda | | B60N 2/58 |
| 9,604,555 B2* | 3/2017 | Fujikake | | B60N 2/289 |
| 9,656,577 B2* | 5/2017 | Sekino | | B60N 2/6009 |
| 9,676,304 B2* | 6/2017 | del Puerto Camargo | | |
| | | | | B60N 2/2887 |
| 9,738,183 B2* | 8/2017 | Szlag | | B60N 2/58 |
| 9,981,581 B2* | 5/2018 | Okuhara | | B60N 2/58 |
| 2002/0104190 A1* | 8/2002 | Moore | | B60N 2/2809 |
| | | | | 16/231 |
| 2015/0084388 A1 | 3/2015 | Arai et al. | | |
| 2015/0145297 A1* | 5/2015 | Lee | | B60N 2/60 |
| | | | | 297/219.1 |
| 2017/0015226 A1* | 1/2017 | Wolas | | B60N 2/5628 |

\* cited by examiner

VEHICLE SEAT

CROSS-REFERENCE TO RELATED APPLICATION

This application claims priorities from Japanese Patent Application No. 2016-209711 filed on Oct. 26, 2016, the entire subject matters of which is incorporated herein by reference.

TECHNICAL FIELD

The present disclosure relates to a vehicle seat, and particularly to a vehicle seat in which an ISOFIX anchor for fixing a child seat is provided in a through-hole which extends in a front and rear direction and is formed in a seat body.

BACKGROUND

In the related art, a configuration is known in which an ISOFIX anchor as an attachment tool for fixing a child seat is provided in a rear seat surface of a vehicle seat (for example, see JP-A-2015-085730). The ISOFIX anchor is provided in the state of being embedded in a hole which is formed though a portion formed in a rear end portion of a seat cushion and bulging in a bank shape. The embedded hole of the ISOFIX anchor is normally configured such that a front-side opening is covered with a cover member which is openable and closable. When the child seat is mounted, the cover member is opened so that the ISOFIX anchor therein is exposed to a front side.

In the above-described related art, the embedded hole of the ISOFIX anchor is covered from the front side in appearance with the cover member. However, in the cover member, in a case where cooling air of a battery flows in a back-side area of the seat, it cannot be appropriately prevented that the cooling air flows to leak out through the hole to the seat front side.

SUMMARY

The present disclosure is made in consideration of the above-mentioned circumstances, and one of objects of the present disclosure is to provide a vehicle seat that is capable of appropriately preventing airflow from flowing in from a seat back side to a seat front side through an embedded hole of an ISOFIX anchor.

According to an illustrative embodiment of the present disclosure, there is provided a vehicle seat in which an ISOFIX anchor for fixing a child seat is provided in a through-hole which extends in a front and rear direction and is formed in a seat body, the vehicle seat including: a cover member which covers an opening on a seat front side of the through-hole in an openable and closable manner; and a plug member which is capable of being pushed into the opening on the seat front side of the through-hole in a drawable manner, wherein the plug member is configured to block an air-flowing channel of an air which flows in from an opening on a seat back side of the through-hole and flows out from the opening on the seat front side of the through-hole in a state where the plug member is pushed into the opening.

According to another illustrative embodiment of the present disclosure, there is provided a vehicle seat including: a seat body; a through-hole formed in the seat body and extends in a front and rear direction of the vehicle seat between a front opening on a seat front side and a rear opening on a seat rear side; an ISOFIX anchor located inside the through-hole; a cover member configured to be movable between a closed position at which the cover member covers the front opening of the through-hole and an opened position at which the front opening of the through-hole is exposed; and a plug member that is configured to be movable between an inserted position at which the plug member is inserted into the through-hole to plug the front opening of the through-hole and an extracted position at which the plug member is extracted out from the through-hole to expose the ISOFIX anchor from the front opening of the through-hole.

DETAILED DESCRIPTION

Hereinafter, embodiments of the present disclosure will be described with reference to the drawings.

Figure 1:
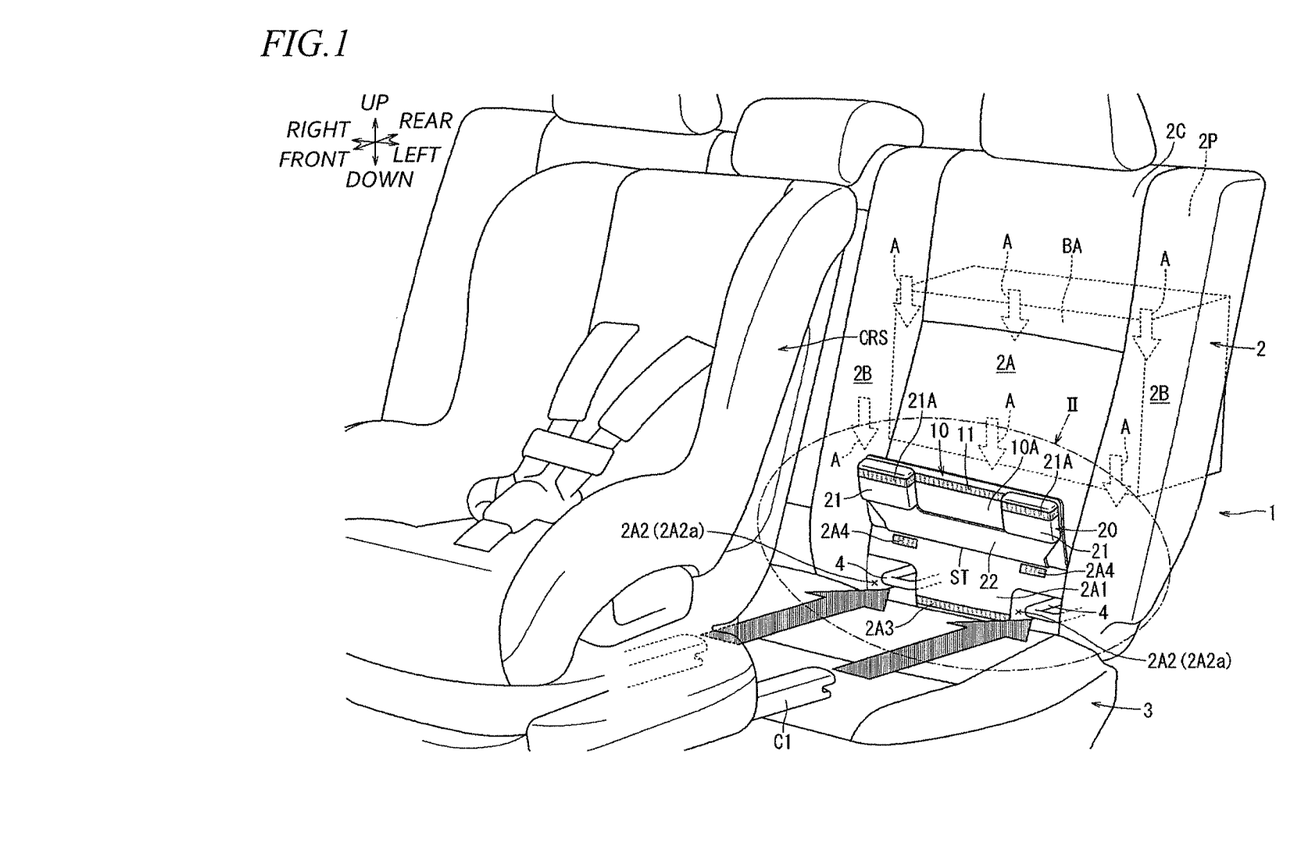
FIG. 1 is a perspective view illustrating a schematic configuration of a vehicle seat of a first embodiment.

First, a configuration of a seat 1 (vehicle seat) according to a first embodiment will be described with reference to FIGS. 1 to 12. In the following description, directions such as front, rear, upper, and lower directions mean respective directions illustrated in the drawings. As illustrated in FIG. 1, the seat 1 of this embodiment is configured as a rear-side seat of a hybrid vehicle, and includes a seat back 2 as a back rest part of a sitting occupant and a seat cushion 3 as a seating part. The seat 1 is configured as a divided seat on a narrow side in a bench seat on which three people can sit and which is divided at a ratio of 6:4 in a width direction. A battery BA is mounted in a back lining of the seat back 2, and cooling air A for cooling the battery BA flows in a gap between the same battery BA and the back lining.

The seat back 2 includes a top plate body 2A which forms the central portion of the front surface thereof in the width direction, and top plate sides 2B which form both side portions in the width direction. The former top plate body 2A is configured to have a relatively flat surface shape and to support the back of the sitting occupant from the rear side. The latter top plate sides 2B are configured to have such a surface shape that each of the top plate sides 2B is obliquely bulging to frontal outside in a mountain shape and to obliquely support the back of the sitting occupant from both sides.

The seat back 2 is configured to be covered entirely with a urethane-foam back pad 2P which functions such that the backrest load of the sitting occupant is elastically received with respect to a metal back frame (not illustrated) forming the inner frame thereof. Further, in the seat back 2, the appearance design surface thereof is shaped such that the entire external surface of the back pad 2P is covered with a synthetic-leather back cover 2C. The basic shape of the seat back 2 is formed by the back pad 2P provided in the back cover 2C.

A lower region of the top plate body 2A of the seat back 2 is attached with a horizontally long cover member 10 which is made of synthetic leather and covers the same region in an openable manner from a front side. In the cover member 10, the upper edge is integrally sewn with the back cover 2C (sewn part ST), the lower region of the top plate body 2A is covered or opened to be exposed with respect to the outside by the rotation movement of the upper hinge centered on the sewn part ST (see FIGS. 2 and 6).

Figure 2:
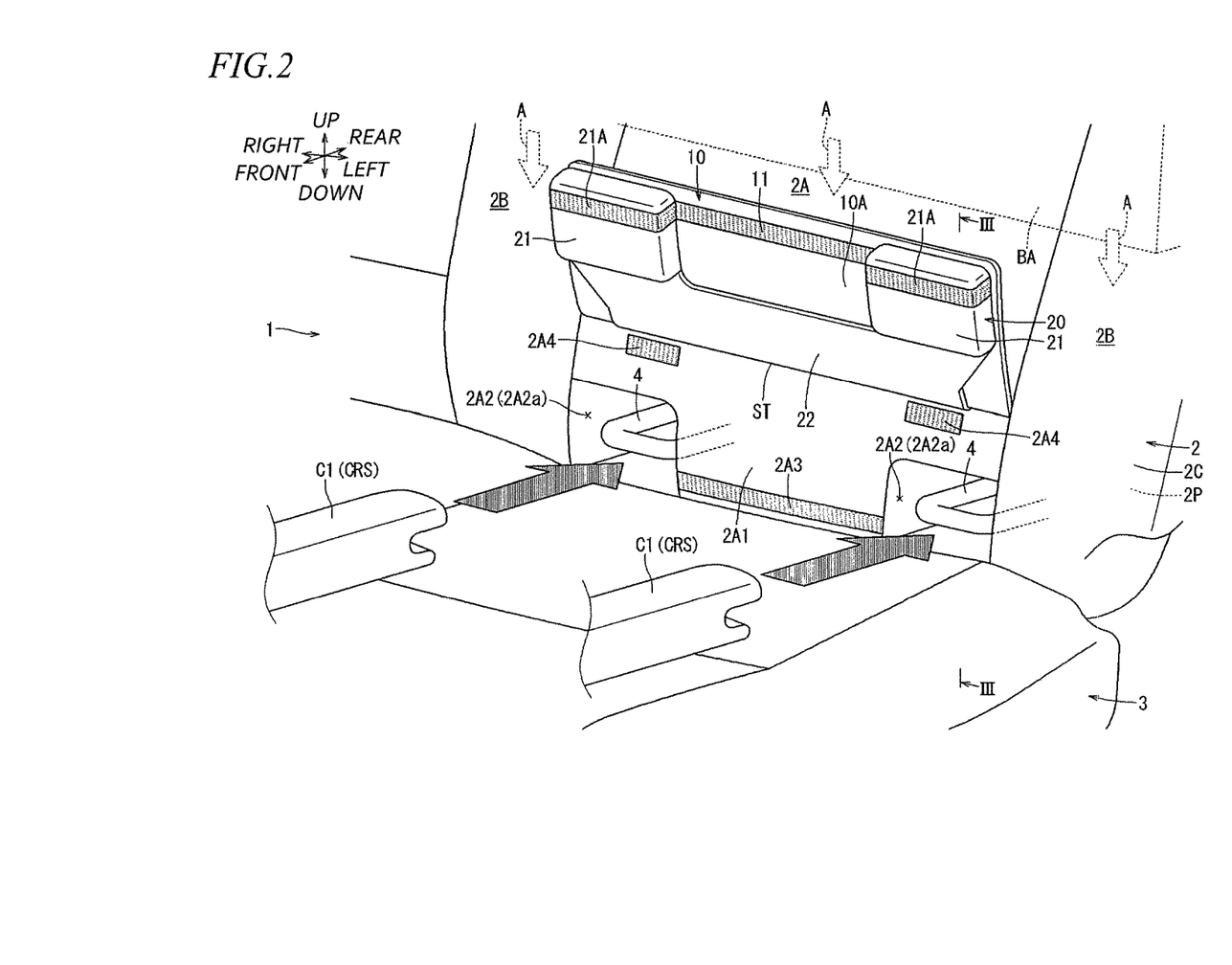
FIG. 2 is an enlarged view of a portion shown by arrow II in FIG. 1.
Figure 3:
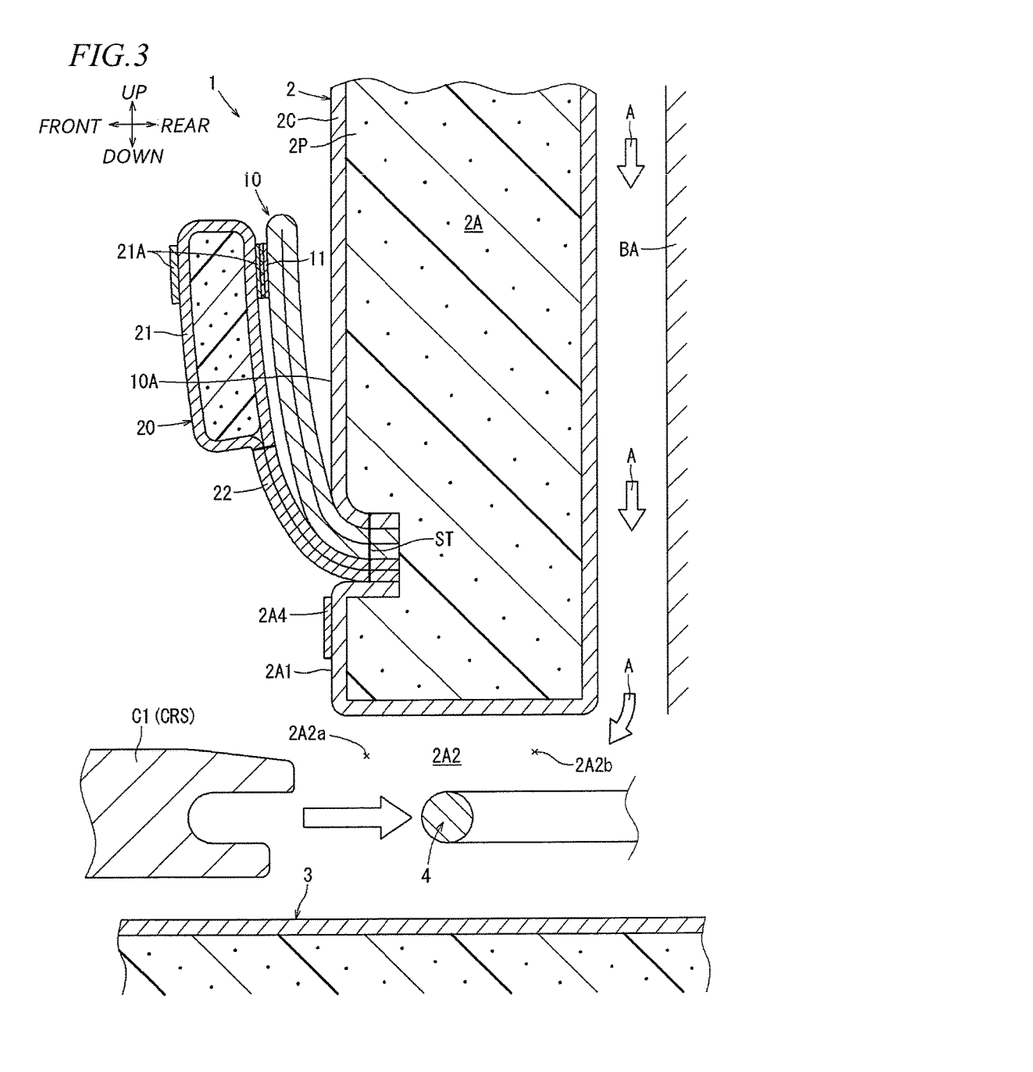
FIG. 3 is a sectional view taken along line III-III shown in FIG. 2.

As illustrated in FIGS. 2 and 3, in the lower region of the top plate body 2A of the seat back 2 covered with the cover member 10, holes 2A2 which pass through in the front and rear direction and are substantially rectangular in a front view are formed in lower corner portions on both of the right and left end sides. Specifically, each of the holes 2A2 is formed in a shape that passes through in the front and rear direction and a lower direction with respect to the seat back 2. However, the opening of the hole 2A2 in the lower direction is normally maintained in a closed state by abutting the rear end portion of the seat cushion 3 in FIG. 1 thereon from the lower side.

As illustrated in FIGS. 2 and 3, in the holes 2A2, a pair of right and left ISOFIX anchors 4 which extend from the rear lower side of the seat 1 to be fixed on a vehicle panel (not illustrated) are provided to pass from the rear side. The ISOFIX anchors 4 function as an anchor for fixing a child seat CRS, and are formed to extend in a substantially U shape in a plan view from the vehicle panel (not illustrated) to the front side. In the ISOFIX anchors 4, connectors C1 are locked thereto in such a manner that the connectors C1 provided in the two right and left places on the rear lower side of the child seat CRS are operated to be pushed from the front side with respect to the anchors (see FIGS. 11 and 12).

As illustrated in FIGS. 2 and 3, in the holes 2A2, the cover member 10 and a plug member 20 (to be described) which is provided to be separately stacked on the back side of the cover member 10 are provided on the front side, so that the hole shapes thereof are exposed to be checked visually from the front side. By such an exposure, an operation can be easily performed which inserts the connectors C1 of the child seat CRS into respective holes 2A2.

Figure 6:
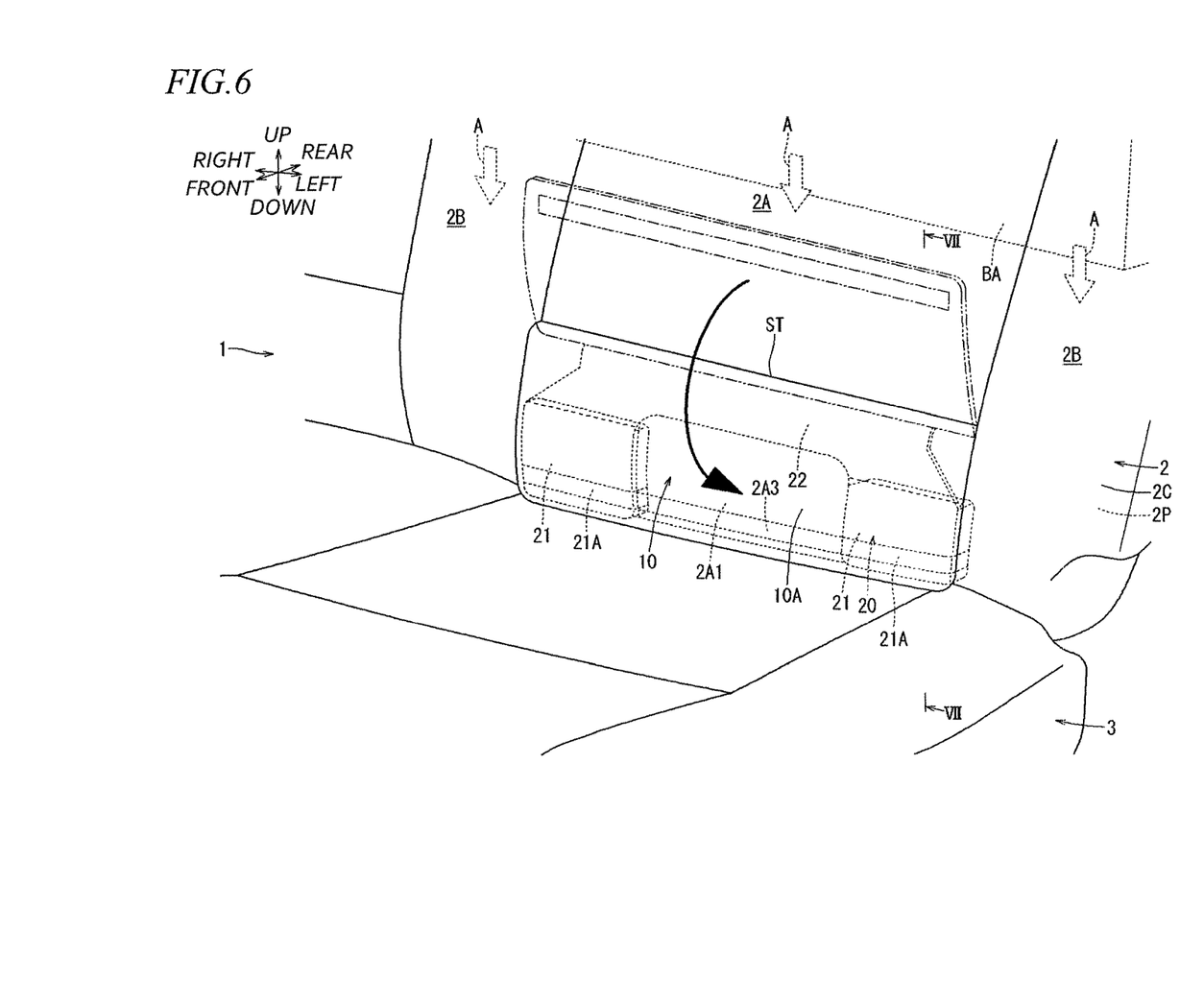
FIG. 6 is a perspective view illustrating a state where the cover member is closed.
Figure 7:
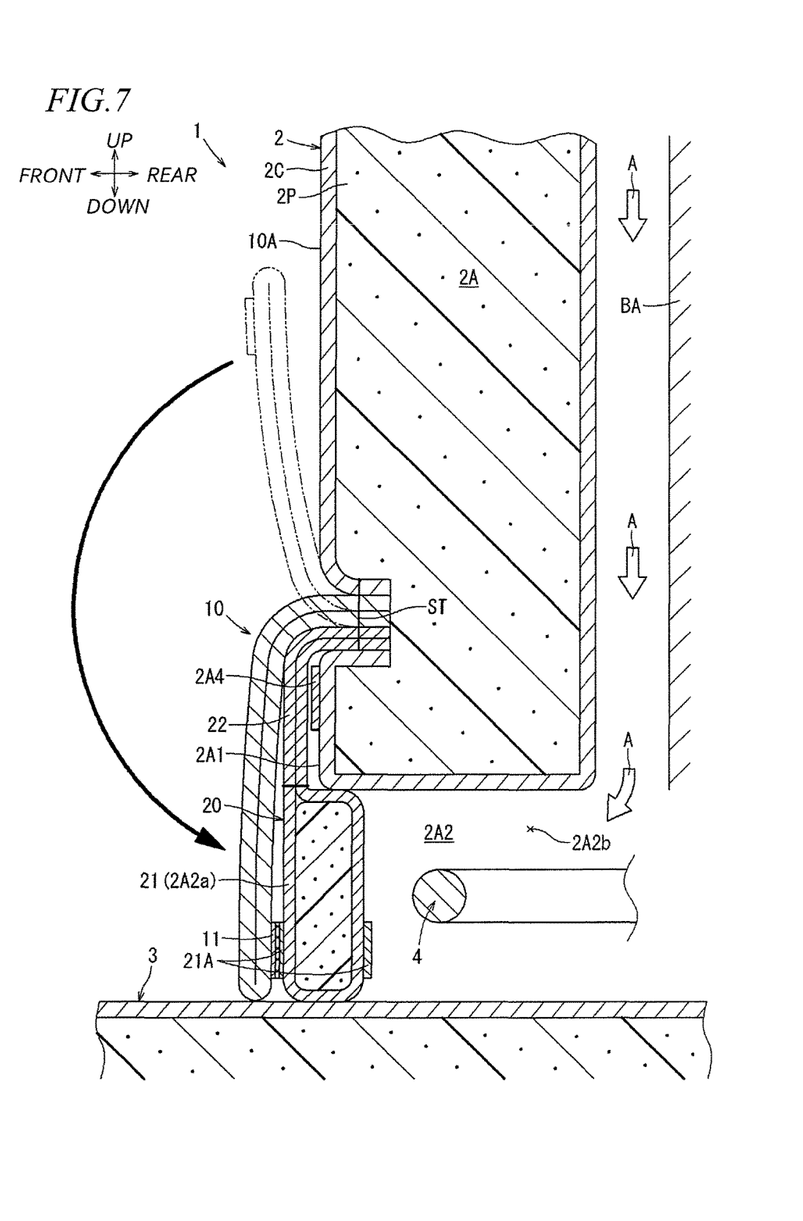
FIG. 7 is a sectional view taken along line VII-VII shown in FIG. 6.

As illustrated in FIGS. 6 and 7, in the holes 2A2, during the non-use state in which the child seat CRS is not attached, the cover member 10 is closed so that an opening 2A2*a* on the front side thereof and a covered surface part 2A1 in vicinity thereof are maintained to be covered all together with the cover member 10 from the front side. Incidentally, the covered surface part 2A1 and the inner peripheral surfaces of the holes 2A2 are configured such that the back pad 2P is not exposed, and a fabric cover piece covers the external surface. Herein, the seat back 2 corresponds to a "seat body" of the present disclosure.

However, the cover member 10 covers the holes 2A2 so as not to be seen in appearance, but does not cover to such an extent that the opening 2A2*a* on the front side thereof is closed to be a sealed state. Specifically, the cover member 10 is configured to be maintained to have the closed posture in such a manner that a horizontally-long band-shaped hook-and-loop fastener 11 (hook surface) sewn with the lower edge of the a back-side surface 10A thereof abuts on from the front side to be coupled with a horizontally-long band-shaped hook-and-loop fastener 2A3 (loop surface) sewn with the lower edge (the lower edge in an area between the arranged holes 2A2) of the covered surface part 2A1 which the cover member 10 faces in the closed state.

For this reason, even when the holes 2A2 are maintained to be covered from the front side with the cover member 10 as described above, an air-flowing channel therein is not blocked. Accordingly, in the holes 2A2, in a case where the cooling air A of the battery BA which flows in the rear area of the seat 1 from an opening 2A2*b* passing through to the rear side flows inside, there is a concern that the flowing cooling air A leaks out from the front opening 2A2*a* toward the sitting occupant. When there occurs such a leakage of the cooling air A, there is a concern that the sitting occupant feels uncomfortable.

Figure 4:
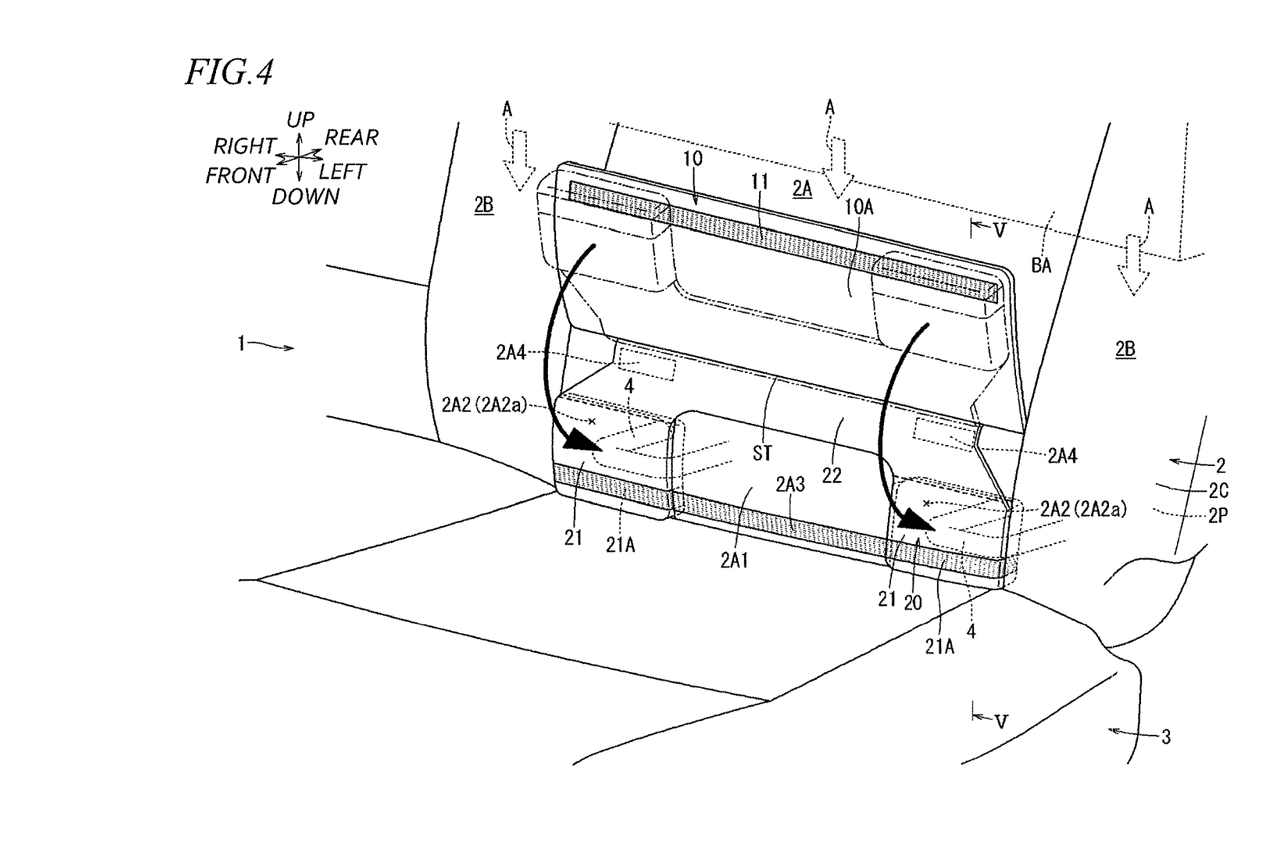
FIG. 4 is a perspective view illustrating from a state where a cover member is opened and to a state where a plug member is pushed into holes.
Figure 5:
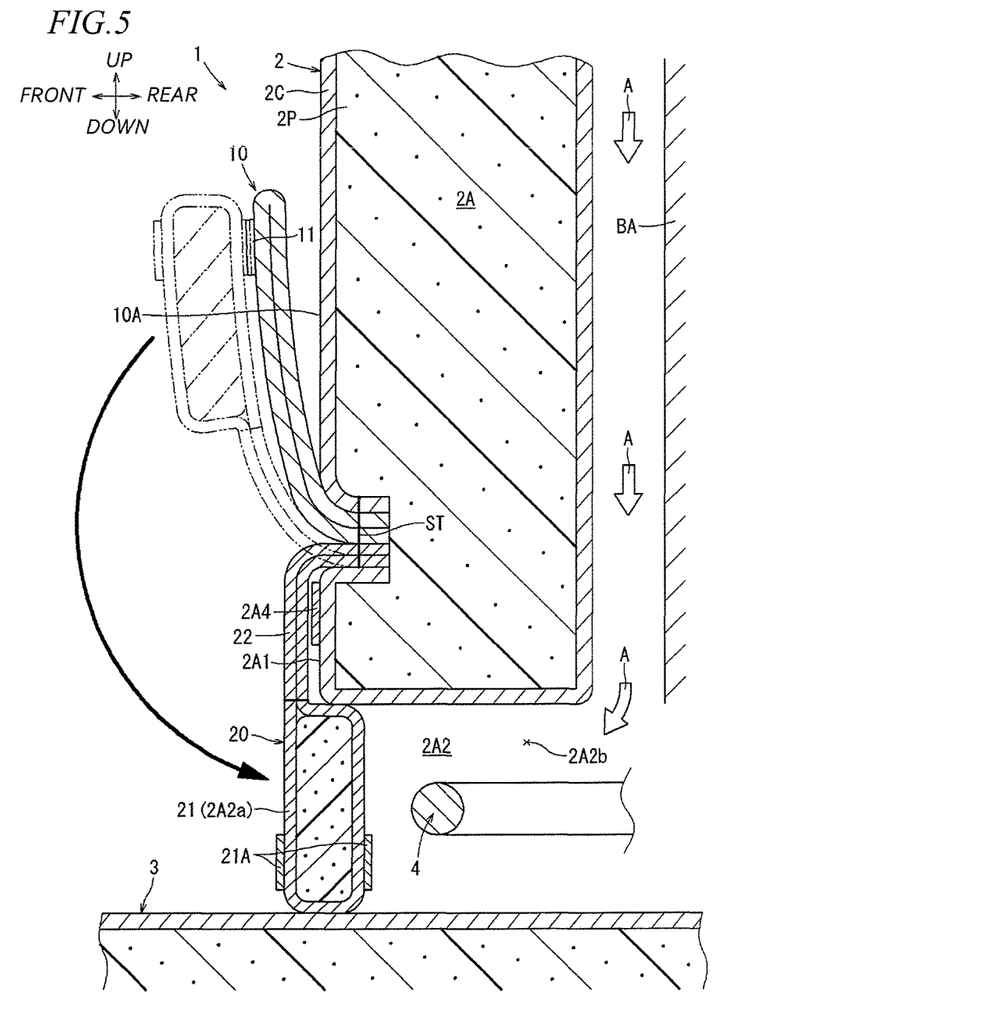
FIG. 5 is a sectional view taken along line V-V shown in FIG. 4.

Herein, in order to prevent the leakage of the cooling air A, as illustrated in FIGS. 4 and 5, the plug member 20 which functions to block the air-flowing channel in the hole 2A2 by pushing in the hole 2A2 from the front side is provided separately from the cover member 10 in the lower region of the top plate body 2A of the seat back 2. As illustrated in FIGS. 2 to 5, the plug member 20 is formed to integrally have a pair of right and left substantially rectangular push pieces 21 which are pushed in the hole 2A2 from the front side to be fitted in a shape to close the hole shape and block the air-flowing channel, and a flexible planar connection surface part 22 which crosses between the upper edges of the push pieces 21 to extend in a horizontally-long band shape.

In each of the push pieces 21, a urethane-foam pad member is buried in a flexible planar cover structure sewn in a bag shape. With such a configuration, each of the push pieces 21 is pushed in the hole 2A2 to be flexibly flattened out to conform with the hole shape of the hole 2A2. The elastic repulsive force associated with the flattening acts such that the air-flowing channel in the hole 2A2 is blocked appropriately.

As illustrated in FIGS. 2 and 3, the plug member 20 is arranged to be stacked on the back side of the cover member 10, and the upper edge of the connection surface part 22 and the upper edge of the cover member 10 are attached to be integrally sewn with the back cover 2C (sewn part ST). By the attachment, similarly to the cover member 10, the plug member 20 is configured to be rotated about a rotation center (sewn part ST) of the upper hinge separately from the cover member 10.

Figure 8:
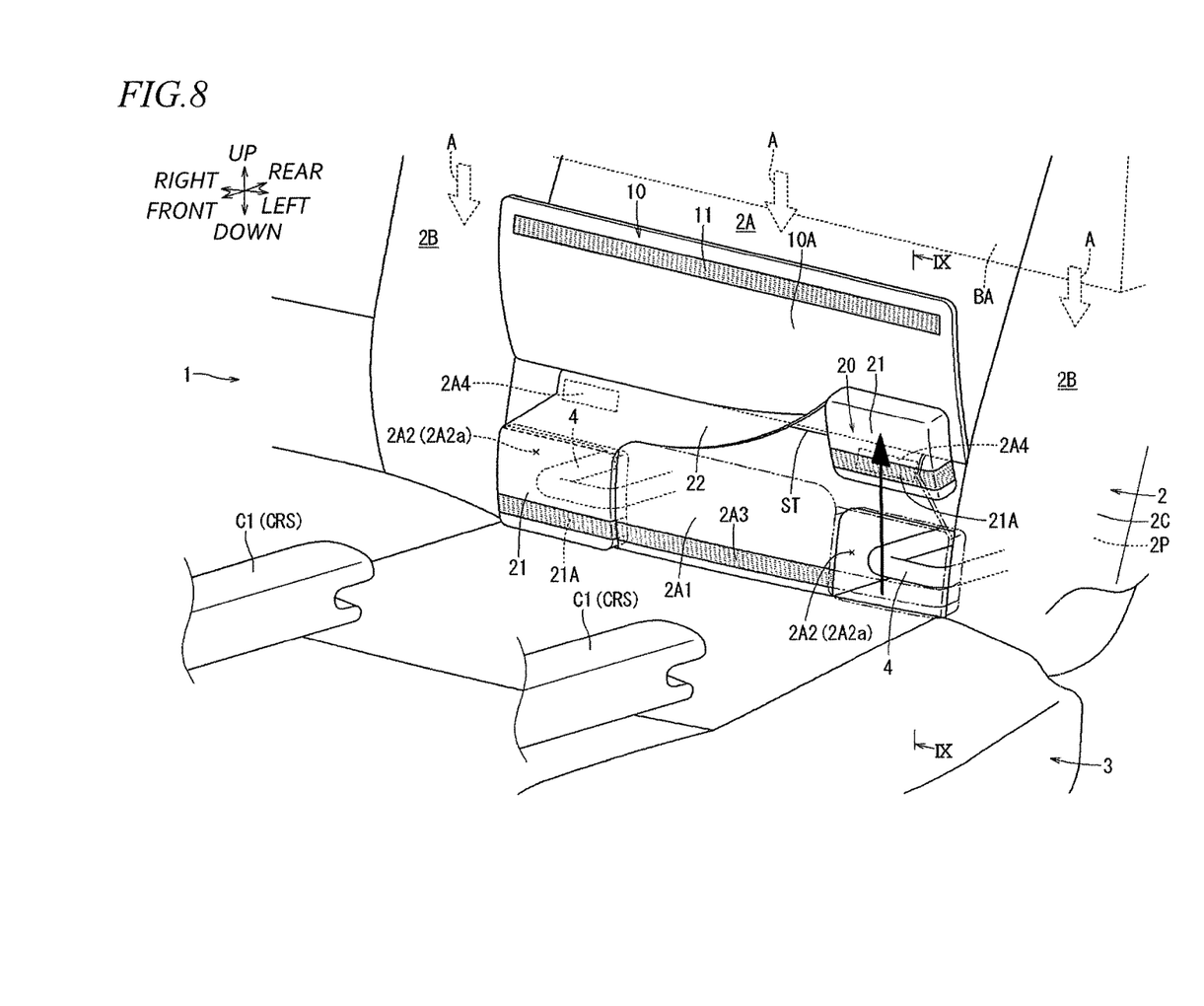
FIG. 8 is a perspective view illustrating a state of the cover member switched from the state illustrated in FIG. 6 by detaching the plug member from the hole on one side so that the cover member is position-fixed.
Figure 10:
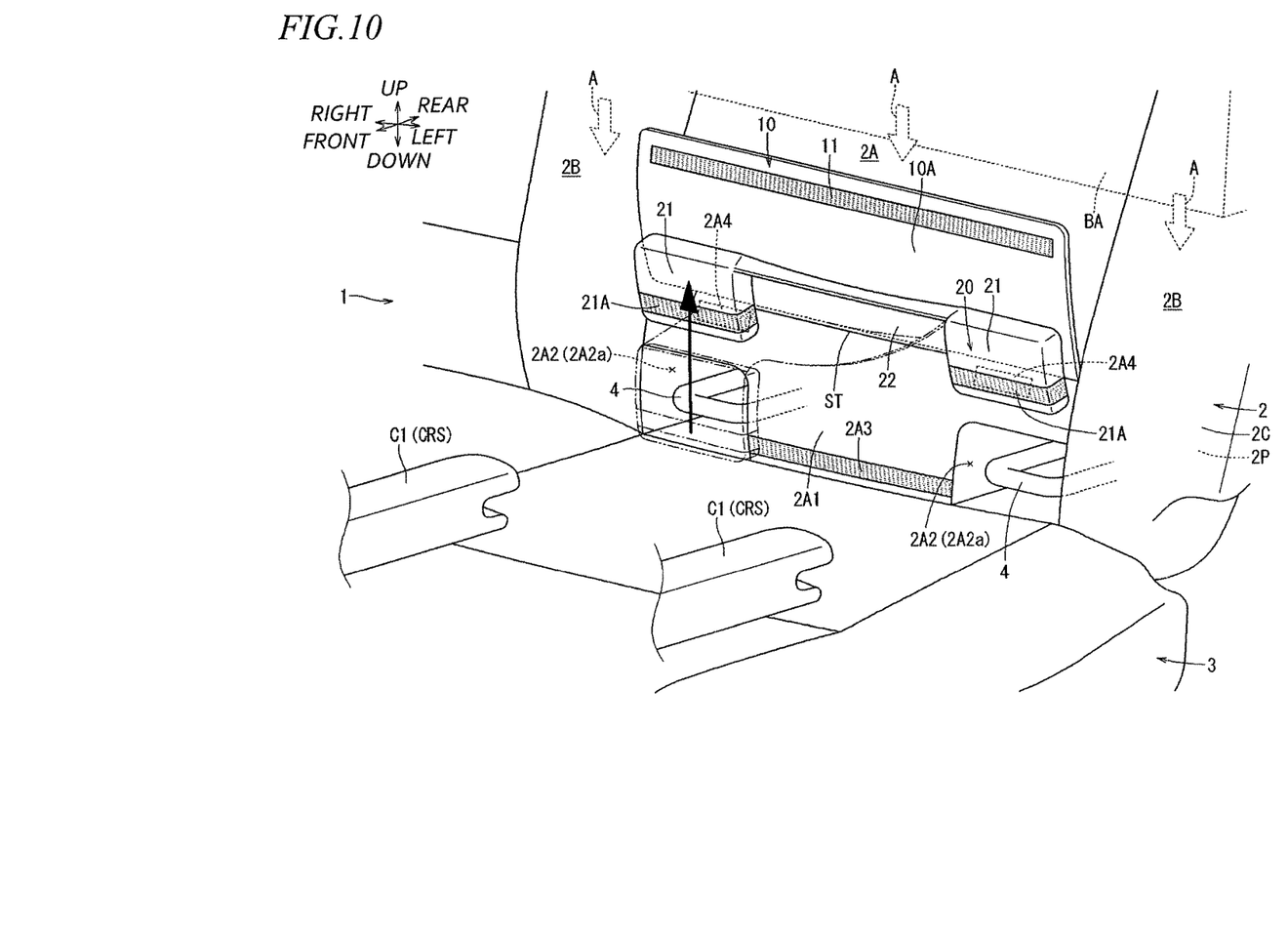
FIG. 10 is a perspective view illustrating a state of the cover member switched from the state illustrated in FIG. 8 by further detaching the plug member from the hole on the other side so that the cover member is position-fixed.

In the plug member 20, in addition to the hinge-connected configuration, the flexibility of the connection surface part 22 makes the push piece 21 be simply pushed in the hole 2A2 individually or be detached to the front side individually from the hole 2A2 as illustrated in FIGS. 8 and 10. With such a configuration, as illustrated in FIGS. 4 and 5, in the plug member 20, the push piece 21 can be appropriately pushed in while individually checking the inside of the hole 2A2 visually from a state where the cover member 10 is opened such that the hole 2A2 is seen from the front side.

In the plug member 20, the push piece 21 can be pushed inward with respect to the hole 2A2 to such a position that forms a surface which is nearly flush with the covered surface part 2A1 in vicinity of the hole 2A2. As illustrated in FIGS. 6 and 7, by pushing in as described above, even when the cover member 10 is closed to be stacked on the front side of the plug member 20, the cover member 10 can be closed and held in a shape which makes the cover member 10 substantially flush with the other area of the top plate body 2A without being interrupted by the bulging of the shape from the back side by the plug member 20.

Herein, as illustrated in FIGS. 2 and 3, in the lower edge of the push piece 21 of the plug member 20, a horizontally-long band-shaped hook-and-loop fastener 21A (loop surface) is provided over the entire circumferential area of the external surface along the edge to be sewn annularly. As illustrated in FIGS. 4 and 5, when the push piece 21 is set to be pushed in the hole 2A2, the hook-and-loop fastener 21A (loop surface) sewn with the push piece 21 is provided to be arranged in a lateral line with respect to the hook-and-loop fastener 2A3 (loop surface) sewn along the lower edge of the covered surface part 2A1.

Therefore, after the push piece 21 is set to be pushed in the hole 2A2, by closing the cover member 10, the horizontally-long band-shaped hook-and-loop fastener 11 (hook surface) sewn with the lower edge of the back-side surface 10A of the cover member 10 not only abuts on and is coupled with the hook-and-loop fastener 2A3 sewn along the lower edge of the covered surface part 2A1 as described above, but also abuts on and is coupled with the hook-and-loop fastener 21A sewn along the lower edge of the push piece 21. By coupling as described above, in the cover member 10, both corner portions caught by the formed area of the hole 2A2 are also maintained by the push piece 21 which is pushed in to be fitted into the hole 2A2 to be fixed in a position to prevent rattling with respect to the hole 2A2.

Figure 9:
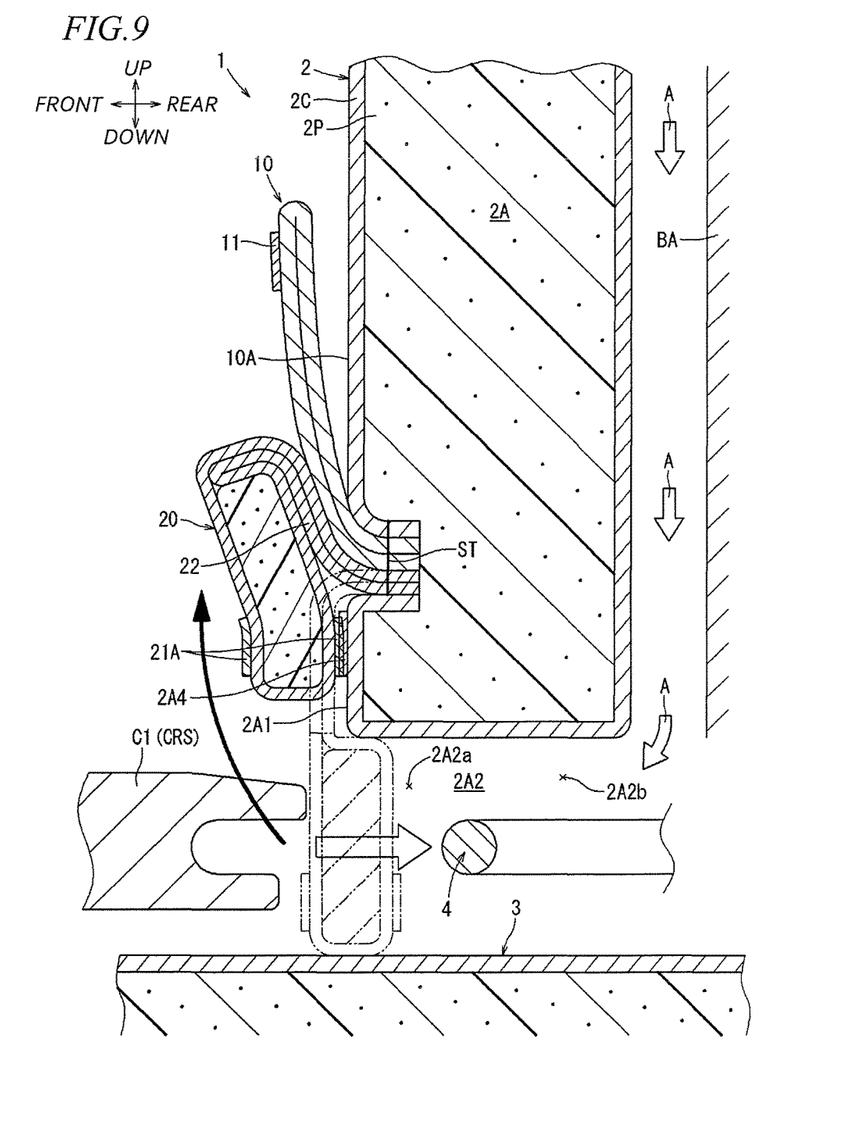
FIG. 9 is a sectional view taken along line IX-IX shown in FIG. 8.

As illustrated in FIGS. 8 to 10, when the cover member 10 is opened so that the connector C1 of the child seat CRS is pushed in and locked with the ISOFIX anchor 4, the plug member 20 is switched to function as a stopper which can maintain the cover member 10 as the opened state by detaching the push piece 21 from the hole 2A2 to change the attachment position thereof as follows. That is, after the cover member 10 is opened, the plug member 20 is switched into the state of preventing the dropping movement of the cover member 10 toward the closed position in such a manner that the push piece 21 is detached forward from the hole 2A2, and the hook-and-loop fastener 21A sewn on the back side of the push piece abuts on and is coupled with the hook-and-loop fastener 2A4 (hook) sewn in the upper place from the hole 2A2 of the covered surface part 2A1.

Specifically, by coupling as described above, the push piece 21 crosses the rotation center (sewn part ST) of the upper hinge of the cover member 10 overhead and is maintained to have a stand-up posture where the shape is overhung. By maintaining the state of the push piece 21, the cover member 10 abuts on and is supported by the push piece 21 to prevent the rotation movement of the cover member 10 toward the closed position, and such a state is maintained. Specifically, the push piece 21 is overhung to the upside by being coupled with the corresponding hook-and-loop fastener 2A4, and is maintained in a state where the connection surface part 22 is pulled upward.

By pulling the connection surface part 22 as described above, even when the push piece 21 receives a closing force by a gravity action of the cover member 10, the push piece 21 receives the closing force as a force of acting a pulling force on the connection surface part 22. Therefore, the cover member 10 can be appropriately maintained in a position as the opened state by a force with which the push piece 21 is coupled with the hook-and-loop fastener 2A4, a force which the connection surface part 22 receives from the gravity action of the cover member 10 as the pulling force, and the hardness of the push piece 21 which receives the force with bending in some degree.

Figure 11:
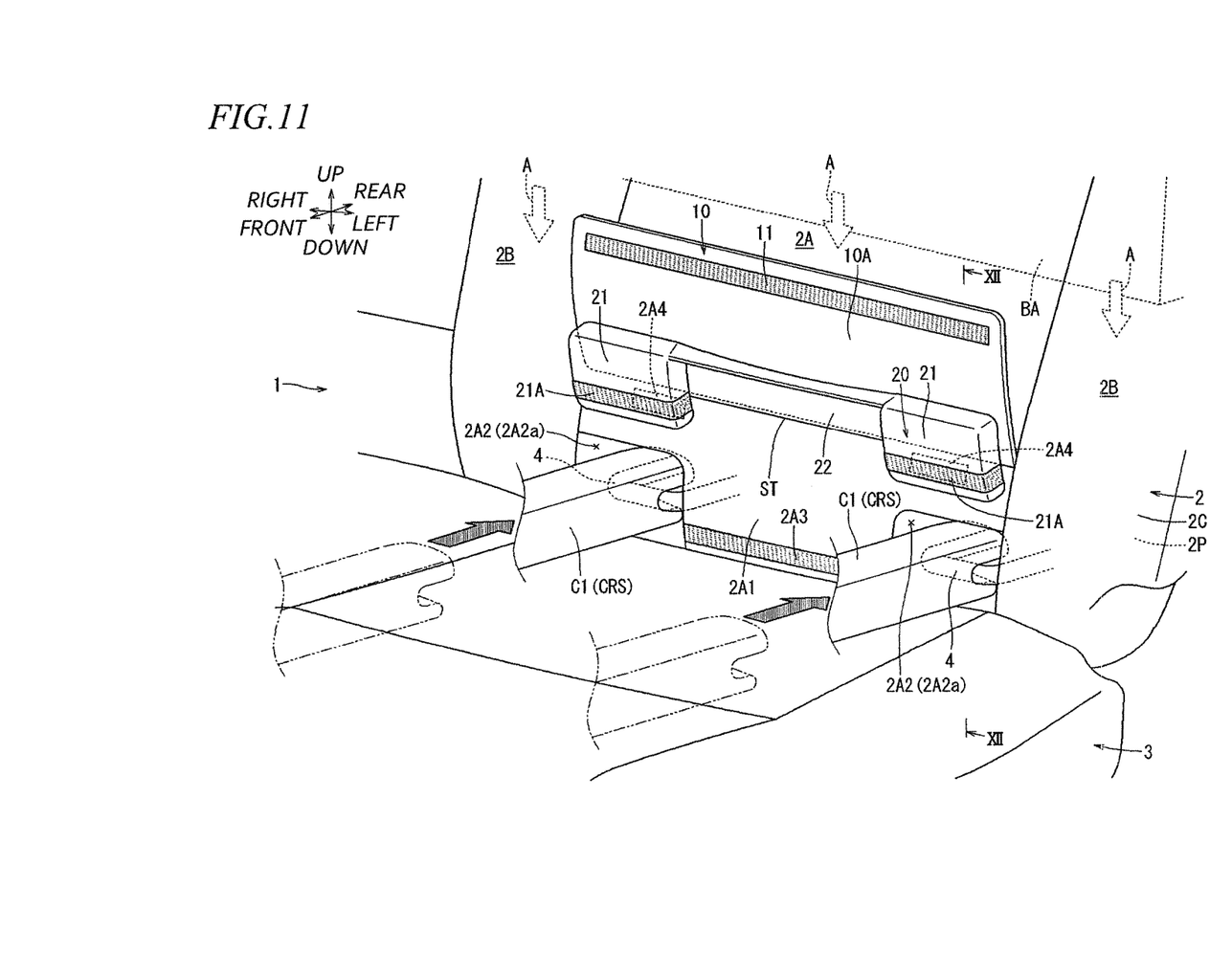
FIG. 11 is a perspective view illustrating a state where a child seat is mounted.
Figure 12:
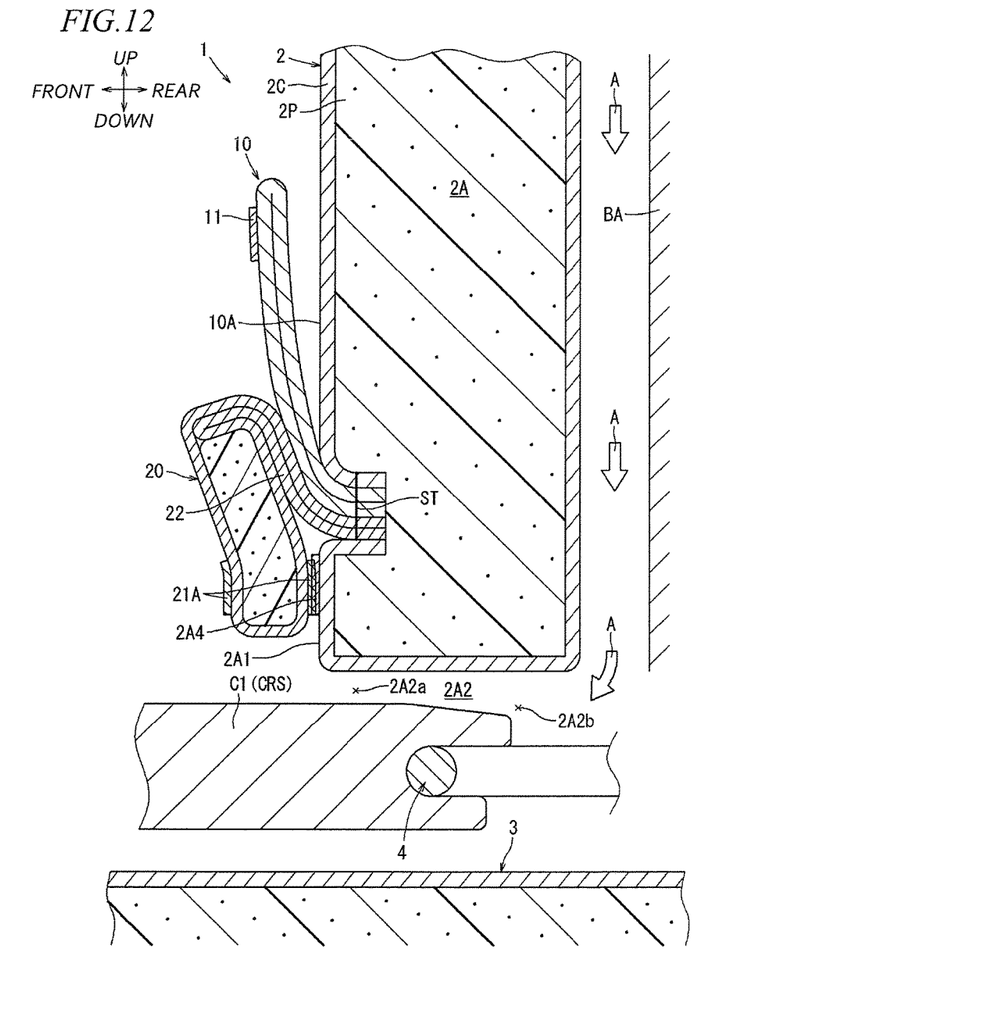
FIG. 12 is a sectional view taken along line XII-XII shown in FIG. 11.

As a result, the cover member 10 is maintained in the opened posture, and thus the hole 2A2 is maintained to be exposed to front side. Therefore, as illustrated in FIGS. 11 and 12, without performing that the cover member 10 is caught and opened by a hand and is maintained as the opened state, the connector C1 of the child seat CRS can be inserted into the hole 2A2 and be locked in the ISOFIX anchor 4, and the child seat CRS can be simply mounted in the seat 1.

To summarize, the seat 1 according to the first embodiment is configured as follows. That is, in a vehicle seat (seat 1), an ISOFIX anchor (ISOFIX anchor 4) for fixing a child seat (child seat CRS) is provided in a through-hole (hole 2A2) which extends in the front and rear direction and is formed in a seat body (seat back 2). The vehicle seat includes a cover member (cover member 10) which covers an opening (opening 2A2a) on a seat front side of the hole (hole 2A2) in an openable and closable manner, and a plug member (plug member 20) which is capable of being pushed in the opening (opening 2A2a) on the seat front side of the hole (hole 2A2) in a drawable (extractable) manner. The hole (hole 2A2) is configured such that the plug member (plug member 20) is pushed in to block an air-flowing channel, so as to prevent that air (cooling air A) which flows in from an opening (opening 2A2b) on a seat back side and passes through a back-side area flows out from the opening (opening 2A2a) on the seat front side.

In this manner, separately from the cover member (cover member 10) which covers the hole (hole 2A2) from the seat front side, by setting the plug member (plug member 20) which is pushed in the hole (hole 2A2) to block the air-flowing channel of the air (cooling air A), it can be appropriately prevented that the air (cooling air A) flows in from the seat back side to the seat front side through the hole (hole 2A2).

The plug member (plug member 20) is separately configured to be pushed in the hole (hole 2A2) in a state where the cover member (cover member 10) is opened. With such a configuration, the operation to push the plug member (plug member 20) in the hole (hole 2A2) can be appropriately performed independently from the operation to close the cover member (cover member 10). In addition, in a state where the cover member (cover member 10) is opened, whether the plug member (plug member 20) is appropriately pushed in the hole (hole 2A2) can be checked visually.

The cover member (cover member 10) is detachable with respect to the plug member (plug member 20), and is stuck to the plug member (plug member 20) which is pushed in the hole (hole 2A2), so as to be maintained to close the hole (hole 2A2). In this manner, by sticking the cover member (cover member 10) to the plug member (plug member 20) which is pushed in the hole (hole 2A2), the cover member (cover member 10) can be appropriately maintained as a state where the hole (hole 2A2) is closed. In addition, by improving the sticking force, the plug member (plug member 20) can be simply drawn out from the hole (hole 2A2)

by the operation to open the cover member (cover member 10) from the hole (hole 2A2).

The cover member (cover member 10) and the plug member (plug member 20) move together by opening/closing rotation of an upper hinge. With such a configuration, when the cover member (cover member 10) or the plug member (plug member 20) is opened from the hole (hole 2A2), there is no concern that the cover member or the plug member rides on the child seat (child seat CRS). Thus, the child seat (child seat CRS) can be maintained in a more stable position-fixed state.

Figure 13:
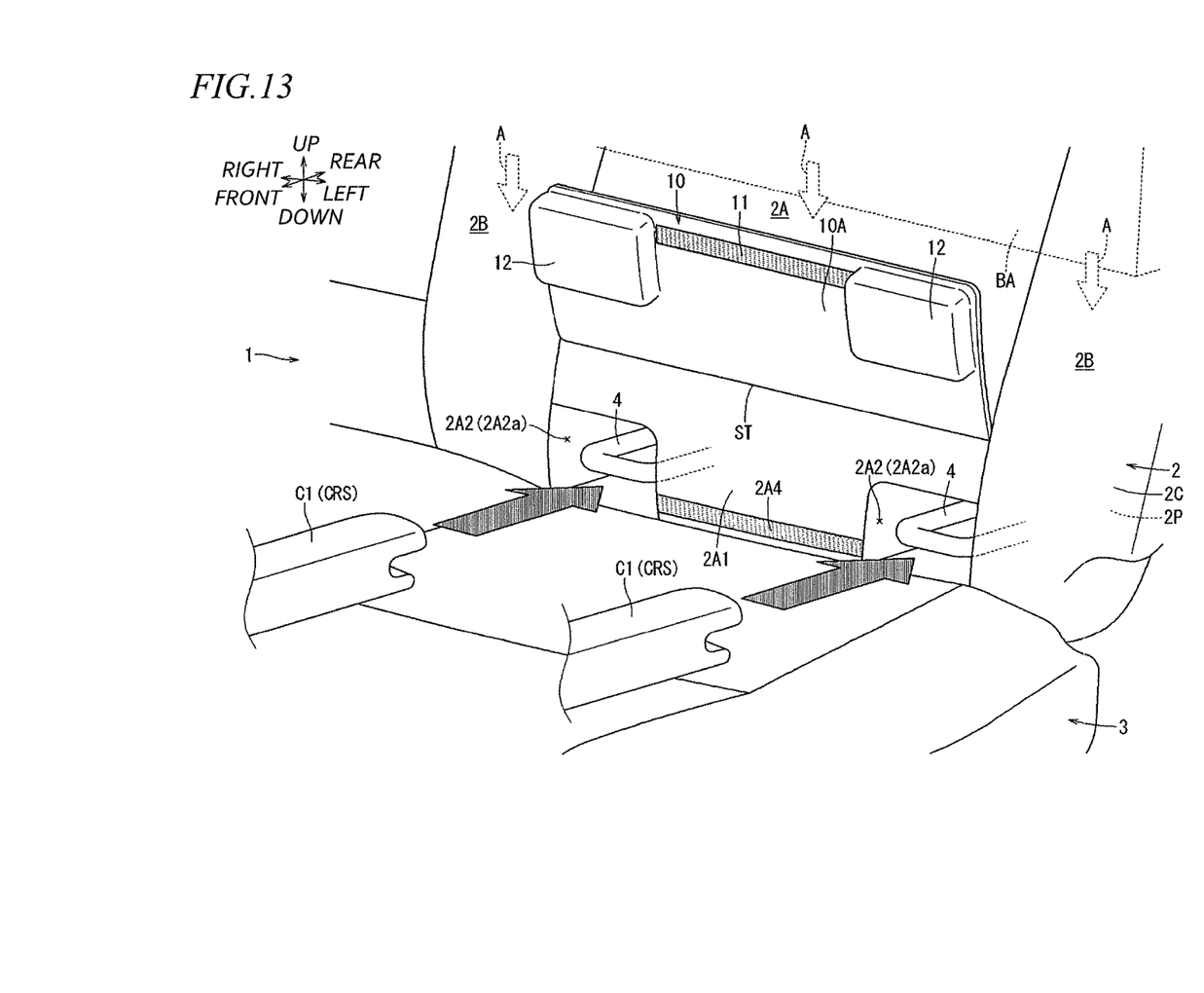
FIG. 13 is a perspective view illustrating a schematic configuration of a vehicle seat of a second embodiment.

Subsequently, the configuration of the vehicle seat (seat 1) according to a second embodiment will be described by referring to FIG. 13. In this embodiment, in the two right and left places of the back-side surface 10A of the cover member 10, the plug member 12 which can be pushed in the opening 2A2a on the front side (seat front side) of the hole 2A2 in a drawable manner is integrally formed to be partially bulging toward the rear side. With such a configuration, the plug member 12 can be pushed in the hole 2A2 or be detached from the hole 2A2 by the opening and closing operation of the cover member 10. Other configurations are the same as the configurations illustrated in the first embodiment. Thus, the corresponding configurations are denoted by the same reference numerals, and the description will not be repeated.

Hereinbefore, two embodiments according to the present disclosure has been described by referring to the accompanying figures, but the invention described in the present disclosure may be implemented in various modes other than the above described two embodiments. For example, the configuration of the vehicle seat of the invention described in the present disclosure may be widely applied to another seat which is supplied for other vehicles such as a vehicle other than the automobile like a train, an airplane, and a ship. In addition, a portion which bulges in a bank shape is formed in the rear end portion of the seat cushion, and the ISOFIX anchor may be provided in the hole formed in the same portion (seat body).

The cover member which covers the opening on the seat front side of the hole to be openable and closable according to the hinge rotation may be configured in such a type that it is rotated by a side hinge or a lower hinge. In addition, a structure in which the cover member is detachable with respect to the plug member may be formed as various detachable structures such as a linear fastener, a button, a hook, and an insertion structure in addition to the hook-and-loop fastener.

What is claimed is:

1. A vehicle seat in which an anchor for fixing a child seat is provided in a through-hole which extends in a front and rear direction and is formed in a seat body, the vehicle seat comprising:
   a cover member which covers an opening on a seat front side of the through-hole in an openable and closable manner; and
   a plug member which is configured to be pushed into the opening on the seat front side of the through-hole in a drawable manner, wherein
   the plug member is configured to block an air-flowing channel of an air which flows in from an opening on a seat back side of the through-hole and flows out from the opening on the seat front side of the through-hole in a state where the plug member is pushed into the opening.

2. The vehicle seat according to claim 1,
   wherein the plug member is configured as a separate body which is separate from the cover member and is configured to be pushed in the through-hole in a state where the cover member is opened.

3. The vehicle seat according to claim 2, wherein
   the cover member is configured to be detachable from the plug member and to be attachable to the plug member which is in a state where being pushed into the through-hole to maintain closure of the hole.

4. The vehicle seat according to claim 1, wherein
   the cover member and the plug member are configured to have an upper hinge portion that allows the cover member and the plug member to move between an opened state and a closed state.

5. A vehicle seat comprising:
   a seat body;
   a through-hole formed in the seat body and extends in a front and rear direction of the vehicle seat between a front opening on a seat front side and a rear opening on a seat rear side;
   an anchor located inside the through-hole;
   a cover member configured to be movable between a closed position at which the cover member covers the front opening of the through-hole and an opened position at which the front opening of the through-hole is exposed; and
   a plug member that is configured to be movable between an inserted position at which the plug member is inserted into the through-hole to plug the front opening of the through-hole and an extracted position at which the plug member is extracted out from the through-hole to expose the anchor from the front opening of the through-hole.

6. The vehicle seat according to claim 5, wherein
   the plug member is fixed to the cover member.

7. The vehicle seat according to claim 6, wherein
   the cover member has an upper hinge portion at which the cover member is attached to the seat body, the upper hinge portion allowing the cover member to be moved between the closed position and the opened position.

8. The vehicle seat according to claim 7, wherein
   the plug member is at the extracted position in a state where the cover member is at the opened position, and wherein
   the plug member is at the inserted position in a state where the cover member is at the closed position.

9. The vehicle seat according to claim 5, wherein
   the plug member is configured as a separate body which is separate from the cover member and is movable between the inserted position and the extracted position while the cover member is at the opened position.

10. The vehicle seat according to claim 9, wherein
    the cover member is attachable to the plug member in a state where the plug member is at the inserted position to be maintained at the closed position.

11. The vehicle seat according to claim 9, wherein
    the cover member has a first upper hinge portion at which the cover member is attached to the seat body, the first upper hinge portion allowing the cover member to be movable between the closed position and the opened position.

12. The vehicle seat according to claim 9, wherein
the plug member has a second upper hinge portion at which the plug member is attached to the seat body, the second upper hinge portion allowing the plug member to be movable between the inserted position and the extracted position.

\* \* \* \* \*